April 30, 1968     W. E. SMITH     3,381,193
INCREMENTAL STEPPING MOTOR APPARATUS AND
METHODS FOR DRIVING Filed Oct. 26, 1964

INVENTOR.
WILLIAM E. SMITH
BY Albert Rosen
Fraser and Bogucki
ATTORNEYS

United States Patent Office 3,381,193
Patented Apr. 30, 1968

3,381,193
INCREMENTAL STEPPING MOTOR APPARATUS AND METHODS FOR DRIVING
William E. Smith, Anaheim, Calif., assignor to California Computer Products, Inc., Anaheim, Calif., a corporation of California
Filed Oct. 26, 1964, Ser. No. 406,243
7 Claims. (Cl. 318—138)

This invention relates to apparatus and methods for visually displaying digital data, and, more particularly, to apparatus and methods for driving an incremental stepping motor which may be used to advantage in systems for displaying digital data in graphical form.

Digital incremental plotters display data in graphical form by controlling the motion of a pen relative to a sheet or a strip of paper. The curve or other plot laid down by the pen comprises a plurality of tiny line segments, each of which is the resultant of orthogonal drive motions of the pen mechanism. The orthogonal drive motions are, respectively, the result of incremental movements of associated stepping motors controlled by driving pulses which may be derived from a computer. For example, one particular digital incremental plotter in general use provides .01 inch steps, with each step thus able to provide a plotted line segment .01 inch in length along either an X axis or a Y axis. A typical plotter includes two stepping motors, one to provide incremental motion along the X axis and the other to provide incremental motion along the Y axis. The basic plotting movements on each axis are in either the plus or minus direction. Therefore, the simultaneous actuation of both stepping motors produce a simultaneous motion along the X and Y axes, yielding a 45° line segment to be plotted by the pen. In such an arrangement, the plotted lines are produced along angles which are multiples of 45° (that is, 45°, 90°, 135°, etc.) and any lines which are otherwise directed are produced by approximation as a composite of line segments at some multiples of 45°.

In a digital incremental plotter of the type described wherein each step increment equals .01 inch, it will be appreciated that the stepping motors must be driven at a relatively high pulse rate if a resultant graph of any significant extent is to be reproduced without undue delay. High pulse repetition rates are readily available from the drive circuitry; however, it has heretofore been necessary to limit the search repetition rates to a level at which the stepping motors can respond accurately and precisely. For each step increment, a stepping motor accelerates, decelerates, and comes to rest in a particular position dictated by the drive pulses previously applied. One of the principal advantages of a digital incremental plotter derives from the one-to-one relationship between the number of drive pulses applied and the number of incremental steps developed by the stepping motor in response thereto, so that the driven pen mechanism is always precisely positioned. Despite this advantage of precise positioning, however, one particular problem in the use of incremental stepping motors in a digital incremental plotter has been that of attempting to operate the stepping motors at increased speed without losing the precision of positioning heretofore mentioned. This precise positioning of the pen mechanism coupled to the stepping motors results principally from a detent action produced when the stepping motor rotor is forcibly aligned with a particular pole position of the stepping motor stator due to the magnetic field maintained therein. It has, however, been found that these stepping motors have a tendency to exhibit electromechanical resonances which interfere with their desired operation when attempts are made to drive the stepping motors at increased stepping speeds. Moreover, conventional methods of energizing a stepping motor which involve the energizing of one or another of the stator poles individually results in a spatial alignment between rotor and stator which produces an undesirable high inductance at the very time when the detent magnetic field is to be collapsed in order that the succeeding magnetic field for the next incremental step motion is to be produced. As a result of the limitations thus present, conventional stepping motors and their associated drive circuitry apparently are limited to a level of operation appreciably lower than that which would be desirable.

Accordingly therefore it is a general object of the present invention to provide an improved arrangement and methods for the operation of an incremental stepping motor drive system.

It is a more specific object of the present invention to provide an incremental stepping motor drive system having the capability of operation at higher stepping speeds than those available with presently known apparatus.

It is a further object of the present invention to provide an incremental stepping motor drive system having a better detent control of the stepping motor rotor by the associated stator fields.

Another object of the present invention is to provide an incremental stepping motor drive system having an improved transient response over corresponding systems which are presently known.

In general, the present invention involves the use of an incremental stepping motor having a stator comprising a plurality of pairs of poles and a rotor in a configuration exhibiting a number of pairs of poles which is different from the number of pairs of stator poles. In one particular embodiment in accordance with the invention, a stepping motor is provided having six stator poles, each individually wound by its own coil, and a rotor having four poles equally displaced about its periphery. The stator coils are connected in series by opposite pairs so that three separate stator energizing circuits are provided.

It has been customary in previously known arrangements to energize such stator poles by individual pairs in sequence so as to develop the desired stepping motion of the associated rotor. Operation in this fashion results in a succession of 30° rotational movements of the rotor in one direction in response to a sequence of movements of the vector of the magnetic fields developed individually by the respective energized stator pole pairs in the opposite direction. Detent action occurs when a pair of rotor poles becomes aligned with a pair of energized stator poles. However, it will be clear that such alignment results in a minimum reluctance for the magnetic flux and correspondingly in maximum inductance for the stator coils being energized.

Movement of the aligned position of the rotor from one stator pole position to another produces a rotation of $\frac{1}{12}$ of a revolution or 30° of rotation. In the digital increment plotter in accordance with the invention, suitable gearing is provided between the stepping motor rotor and the pen drive mechanism so that such rotation of 30° results in a .01 inch step of movement of the pen mechanism.

In accordance with the present invention, a driving arrangement for the stepping rotor of the type described is provided whereby two pairs of stator poles are energized simultaneously to define a rotor position rather than just a single pair being energized for such a purpose. Accordingly, when the rotor is to be stepped to the next position, one of the pairs of energized stator coils is de-energized and the previously de-energized stator coil pair is energized. In this particular arrangement in accordance with the invention, no rotor pole pair is ever completely aligned with any stator pole pair in the rest position. Rather, both pairs of rotor poles are attracted by corresponding pairs of energized stator poles, but because of the disparity in the number of poles between the rotor and stator, the forces of attraction on the two pairs of rotor poles are in opposite directions so that an improved detent action is achieved in the rest position. Moreover, a positioning force is continuously applied to the rotor poles from at least one energized stator pole pair so that the undesirable resonance effect, heretofore present, is effectively eliminated. A reduced circuit inductance, resulting from a slight displacement of any given rotor pair with any energized stator pair advantageously permits driving of the stepping motor at greater pulse repetition rates. Furthermore, greater stepping speed results because a force already exists on the rotor as soon as one stator coil pair is de-energized without having to wait for current to build up in any succeeding coil pair. Accordingly, improved operation results from driving the stepping motor from step to step with each step position being defined by the energization of a set of two pairs of stator coils.

In addition to the improved detent action and other beneficial results accruing from the operation of a stepping motor drive system in this fashion in accordance with the invention, it has further been noted that additional advantages, in particular, greater speed, accrue from the pulsing of the stepping motor drive system in a particular energization sequence in accordance with an aspect of the invention. In one specific embodiment of the invention, circuitry is provided to generate a pair of half-step drive pulses in response to the application of a full-step pulse. Thus in this embodiment, the de-energization of one previously energized coil pair of a set is assured before the energization of the next coil pair to be energized is initiated. This is particularly advantageous where the number of stator coil pairs is three, as in the arrangement described, since it avoids the condition, otherwise encountered at the instant when an incremental stepping motion is initiated, where some magnetic field exists in all three of the stator coil pairs by virtue of the fact that the magnetic field is still collapsing in the recently de-energized coil while it is building up in the recently energized coil.

These advantages are realized by arrangements in accordance with the invention which place no restrictions on the sequence of magnetic polarity of the stator or rotor poles, or upon the necessity for the use of permanent magnets, as has frequently been the case in similar arrangements heretofore developed in the prior art.

A better understanding of the present invention may be had from the following detailed description, taken in conjunction with the accompanying drawings in which.

Figure 1:
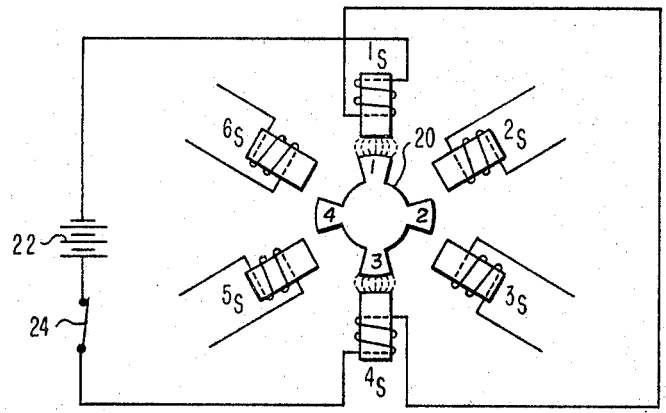
FIG. 1 is a schematic representation of a stepping motor for use in a digital incremental plotter and showing a mode of operation conventionally employed in previously known prior art arrangements.

The schematic diagram of FIG. 1 represents a stepping motor as used in the prior art for driving a digital incremental plotter. As there shown, the motor of FIG. 1 includes a four pole, soft iron rotor 20 surrounded by a stator of six coils (numered 1s–6s) arranged symmetrically around the rotor 20. The coils 1s–6s are each comprised of a coil of wire wound around a laminated soft iron core. The coils may be electrically interconnected as shown in the schematic diagram of FIG. 2 wherein opposite coils are shown electrically connected in series by pairs in circuit with a switch and a power source such as the pair 1s–4s coupled across a power source 22 through a switch 24. Additional switches 32 and 34 are shown in FIG. 2 connected the remaining pairs of coils to additional power sources.

Figure 2:
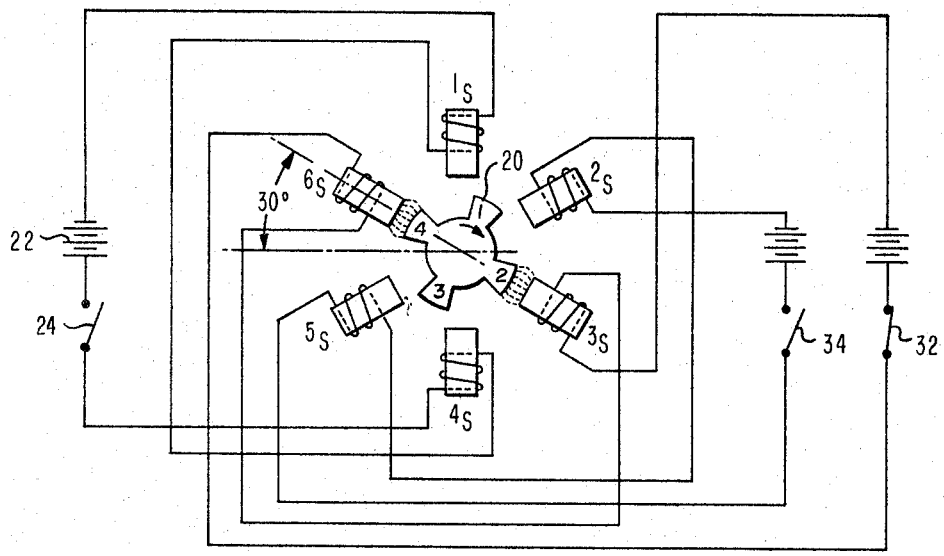
FIG. 2 is a schematic diagram illustrating the arrangement of FIG. 1 in a sequential position following that of FIG. 1 in accordance with a previously known mode of operation.

In previously known arrangements utilizing the circuitry of FIGS. 1 and 2 the rotor 20 is stepped successively by predetermined increments (in this case by 1/12 revolution or 30°) by sequentially energizing individual pairs of coils 1s–6s or 2s–5s. For example, when the pair 1s–4s is energized by the closure of the switch 24, the rotor 20 may be aligned as shown in FIG. 1, with its two opposite poles 1 and 3 in line with the energized pair of stator coils. Subsequent opening of the switch 24 and closure of the switch 32 to change the energized coil pair from 1s–4s to the coils 3s–6s (a counterclockwise shift of the magnetic field vector) results in a clockwise step rotation of the rotor 20 to the position represented in FIG. 2 wherein the remaining pair of rotor poles, 2 and 4, are aligned with the energized pair of coils 3s–6s. It will be seen that this step of rotation corresponds to 30° of angular movement. The rotor 20 will rotate another 30° in a clockwise direction when the remaining pair of stator coils 2s–5s is energized in place of the coils 3s–6s, and so on. Similarly, stepwise rotation of the rotor 20 in the counterclockwise direction is effected by energizing the stator coil pairs to provide clockwise rotation of the magnetic field vector.

Such a system has an inherent disadvantage in that the kinetic energy of the system is at a maximum at a time when it is desired to bring the rotor to an instant stop. For example, when the rotor 20 is stepped from the position shown in FIG. 1 to that shown in FIG. 2, the rotor 20 will have reached maximum velocity and the system will have maximum kinetic energy just as the rotor poles 2–4 become aligned with the stator poles 3s–6s. This is just the time and the precise position that the rotor is to be instantly stopped. To permit high stepping speeds with such an arrangement, it is essential to keep the total system inertia as low as possible, and this places an undesirable limitation on the design of such structures. A further disadvantage of such a system is the effect of the system inductance on the response of the stepping motor to the sharp leading and trailing edges of the driving pulses usually applied. Whenever a stator coil pair is to be de-energized or energized, the inductance is maximum because of the direct alignment of a pair of rotor poles with the corresponding stator poles.

Figure 3:
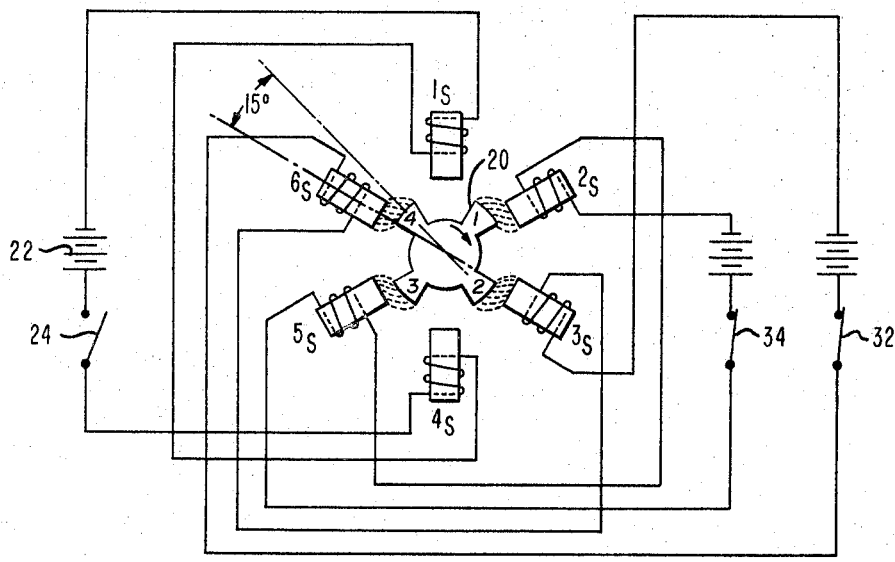
FIG. 3 is a schematic diagram illustrating a stepping motor of the type described driven in a particular mode of operation in accordance with the present invention.
Figure 4:
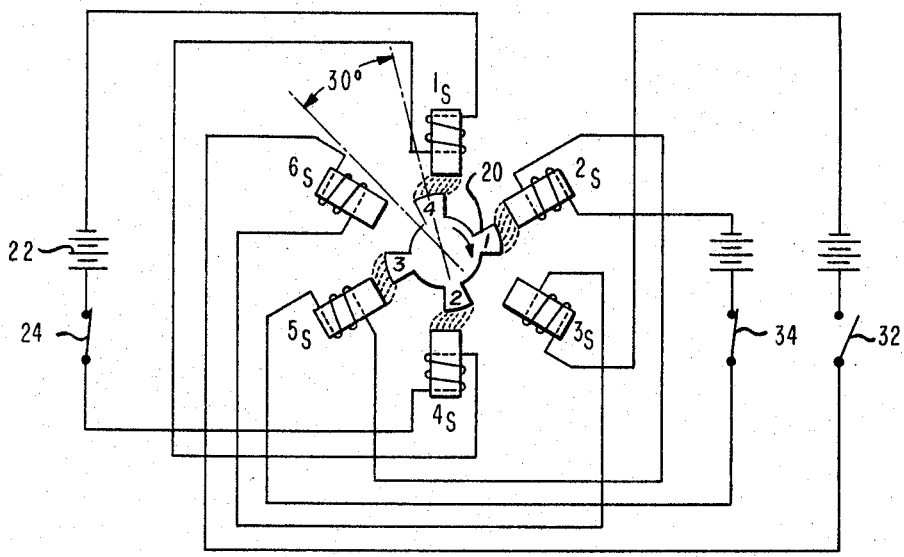
FIG. 4 is a schematic diagram representing the arrangement of FIG. 3 in a sequential position following that depicted in FIG. 3 in accordance with a mode of operation in the present invention.

While the detent action achieved by the mode of operation of the prior art as represented in FIGS. 1 and 2 is desirable, it can be realized in accordance with the invention by a different mode of operation of a stepping motor structure without the above-described undesirable effect upon system kinetic energy and system inductance. FIGS. 3 and 4 illustrate particular arrangements in accordance with the invention for operating a stepping motor in this fashion. It will be noted that in each of these figures two pairs of stator coils are energized for each corresponding step position of the rotor 20, rather than having only a single pair of stator coils energized as was the case in the mode of operation represented in FIGS. 1 and 2. In FIG. 3, coil pairs 2s–5s and 3s–6s are shown energized by the closure of switches 32 and 34, switch 24 being open. The rotor 20 is thereby maintained in the position shown in FIG. 3 with each of its poles being attracted by the magnetic pole established by an adjacent energized stator coil, but with the forces on the poles of the rotor being balanced and applied in opposite directions so that a particular position of the rotor 20 is established as shown. This position corresponds to a 15° rotational displacement of the rotor 20 from a position directly aligned with a given stator pole. A 30° incremental step of rotation of the rotor 20 is achieved by changing to the switch arrangement shown in FIG. 4, that is, by opening the switch 32 and closing the switch 24. This is in effect a rotation of the composite magnetic field vector by one pole position in the counterclockwise direction and results in a 30° clockwise rotation of the rotor 20. Operation of the stepping motor in this manner in accordance with the invention advantageously develops a more rapid collapse of the magnetic field associated with the pair of coils being de-energized and a more rapid buildup of magnetic field in the newly energized coil pair so that the pair of rotor poles associated with the continuously energized coil pair (in the example shown, rotor poles 1–3) serves to accelerate the rotor 20 to maximum velocity as the pole pair is passing the energized coil position. The combined magnetic field of the two energized coil pairs effectively decelerates the rotor 20 as it approaches the detent position. Thus, the rotor can be brought to a complete stop at the proper position in a relatively short time without overshoot or the need for auxiliary detent arrangements. In addition, this particular arrangement develops longer magnetic flux paths in the detent position so that the inductance of the energized coil pairs is decreased with the result that higher speed drive pulses can be employed.

A further improvement in the speed and control of the stepping motor drive system in accordance with a particular aspect of the invention may be realized by an arrangement which, like that described above, provides for incremental stepping motion by energizing the stator coils by sets of coil pairs, but which provides a transition from one set of coil pairs to another set of coil pairs being energized through an intermediate step in which only the coil pair common to both sets is energized for a limited interval of time. In such an arrangement as may be shown in the context of the exemplary circuit configuration of FIGS. 3 and 4, the rotor 20 is stepped from the position of FIG. 3 to the position of FIG. 4 by first opening the switch 32 which serves to de-energize the coil pair 3s–6s and maintaining that circuit condition for a predetermined interval which, in a preferred embodiment, is equal to one half period of the repetitive pulse signal. During this time interval, the rotor 20 moves to an intermediate position between those shown in FIGS. 3 and 4 and, following the predetermined time interval and at an instant when the rotor 20 is at approximately its maximum speed of rotation, the switch 24 is closed to provide the circuit for energizing the next coil pair 1s–4s and thereby establish the circuit condition and rotor position shown in FIG. 4.

Figure 5:
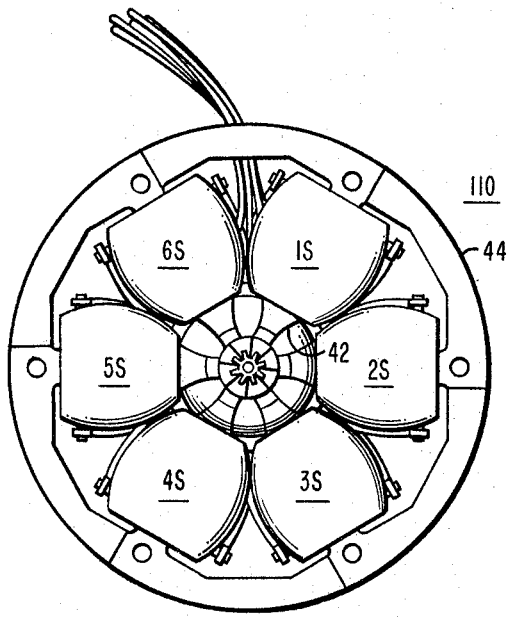
FIG. 5 is a pictorial representation of one particular structure which may be operated as a stepping motor in accordance with the present invention.
Figure 6:
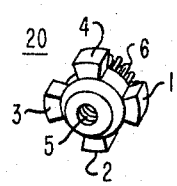
FIG. 6 is a view of the rotor of the stepping motor in FIG. 5.

A particular structural arrangement of a stepping motor which may be operated in accordance with the invention is shown in FIGS. 5 and 6. FIG. 5 is a front elevation of a stepping motor 110 with the housing removed. The stepping motor 110 comprises a plurality of coils 1s to 6s, each wound on a corresponding stator pole such as 42 extending from a circular frame 44 which provides a desired return path for magnetic flux. A rotor 20 is centrally positioned within the stepping motor 40. The rotor 20 is shown in greater detail in FIG. 6, which is a perspective view of the rotor 20 taken from the side opposite that which is shown in FIG. 5. As shown, the rotor 20 has four poles, 1–4, an axial opening 5 for mounting on a shaft, and an associated drive gear 6. The structure represented in FIGS. 5 and 6 corresponds schematically to that which is represented in FIGS. 3 and 4.

Figure 7:
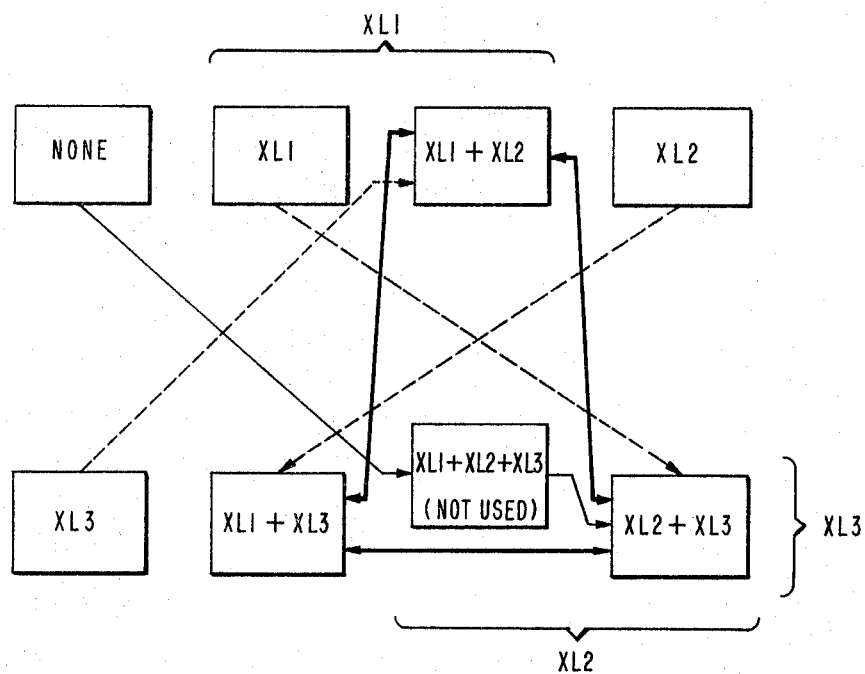
FIG. 7 is a diagram representing the mode of operation of the motor of FIG. 5 in accordance with the invention.

FIG. 7 is a Veitch diagram illustrating the manner in which the control circuitry for the operation of the stepping motor 110 of FIG. 5 may be operated in accordance with the invention. The diagram of FIG. 7 corresponds to the control of a stepping motor 110 for a single one of the two coordinate axes, for example X-axis motor. It will be realized that the stepping motor of the opposite coordinate axis may be controlled in identical fashion. The control circuitry for the stepping motor may advantageously comprise a plurality of flip-flop stages (described in greater detail herein below). The flip-flop stages may be set in the manner to be described; for example, each pair of coils of the stepping motor such as the pair 1s–4s may be controlled by a single flip-flop in place of the switch 24 (see FIG. 3) with one output of the flip-flop establishing the energized state of the coils 1s–4s and the other output of the same flip-flop establishing the de-energized state of the associated coil pair.

Figure 8:
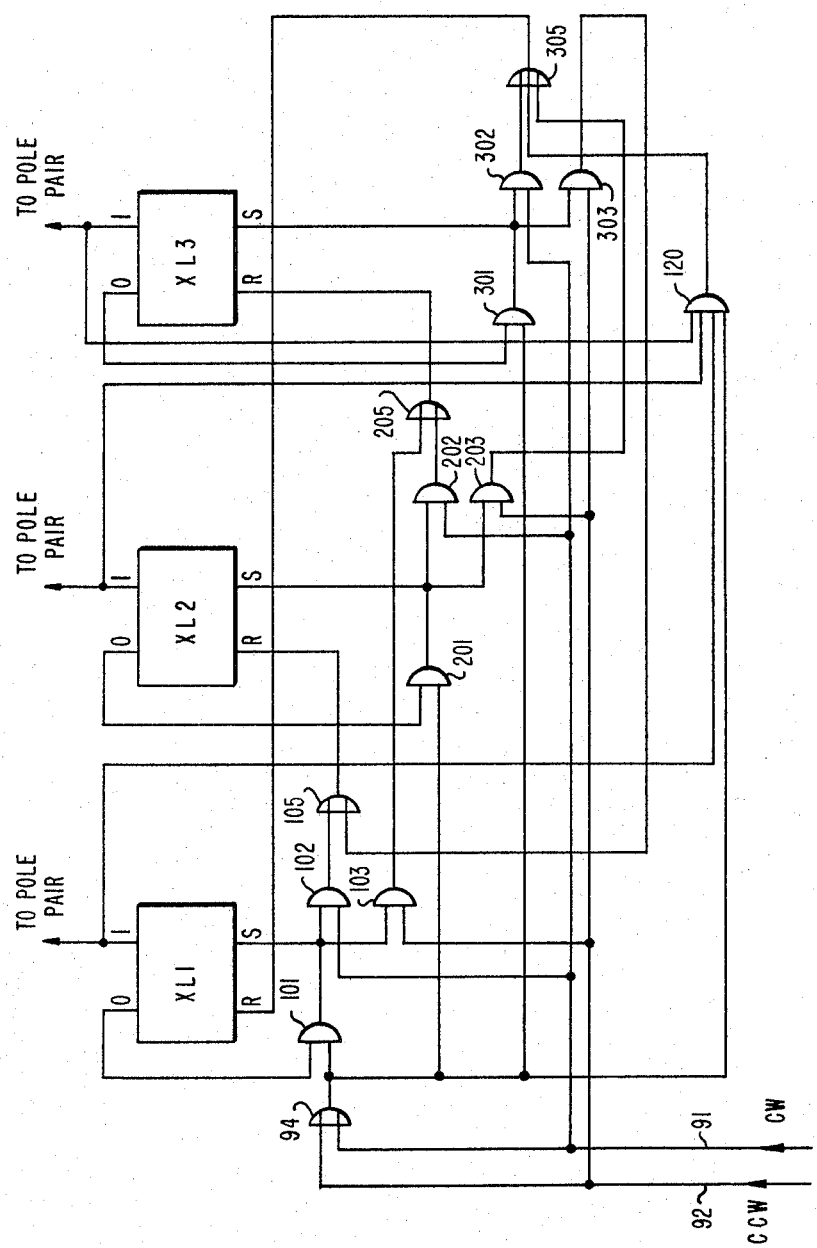
FIG. 8 is a block diagram illustrating one particular arrangement of control circuitry used in a stepping motor control system in accordance with the invention.

The Veitch diagram of FIG. 7 represents the various states which may be established by a number of control flip-flops in accordance with the invention. FIG. 8 is a circuit diagram used to effect the changes between the states as shown in FIG. 7. In FIG. 7, the blocks designated XL1, XL2, and XL3 represent respectively the energized states for flip-flops controlling the corresponding coil pairs. For example, XL1 may correspond to the energization state of the first coil set, 1s–4s; XL2 may correspond to the energization state of the second coil set 3s–6s; and XL3 may correspond to the energization state of the third coil set 2s–5s; this correspondence being established so that a sequential actuation of the various energized states in the order XL1–XL2–XL3 provides a clockwise rotation of the rotor 20. Similarly, the block XL1 plus XL2 corresponds to the state of energization of both the first and second coil sets, 1s–4s and 3s–6s. The block XL2 plus XL3 corresponds to the energization of both the second and third coil sets, and the block XL1 plus XL3 corresponds to the energization of the first and third coil sets. To complete the diagram, additional states, XL1 plus XL2 plus XL3 representing the energization of all three coil sets, and NONE, representing the case when none of the coil sets are energized, are included although these additional states are not used in the normal operation of the invention. As shown in FIG. 7, the blocks XL1 and XL2, XL2 plus XL3, and XL1 plus XL3 are interconnected by heavy lines having arrows pointing in both directions to indicate that a transitional step may proceed in either direction between the recited blocks. In the particular embodiment represented by the Veitch diagram of FIG. 7, the blocks XL1, XL2 and XL3 correspond to stages which are not used except where the circuit is inadvertently set in such a state, as for example may occur when the equipment is first turned on for operation. In such a case, the very next drive pulse which is applied to the system produces a transition as indicated by the broken lines of FIG. 7. For example, if the circuit is energized in accordance with the block XL3, the next drive pulse causes a transition to the stage XL1 plus XL2 wherein a set of two coil pairs is energized and thereafter transitions occur to one or the other of the coil sets depending upon whether the next drive pulse received calls for clockwise or counterclockwise step rotation.

In accordance with an aspect of the invention, particular circuitry is provided to take care of the contingency wherein the system may be in the condition of either all flip-flops energized (the stage XL1 plus XL2 plus XL3) or none energized, as may occur when the apparatus is first turned on. The transitional steps are indicated by the light lines with single directional arrows through the succeeding drive pulses developed by transition from the NONE state to the XL1 plus XL2 plus XL3 state and thence to the XL2 plus XL3 state, after which operation is as has been described.

Although the Veitch diagram of FIG. 7 has been constructed to represent three dimensions, corresponding to the three coil pairs which may be energized in the stepping motor described herein, it will be understood that the stepping motor configurations may be utilized having different numbers of stator coil pairs, in which case the Veitch diagram may have different dimensions corresponding to the number of stator coil pairs provided. In other words, the Veitch diagram of FIG. 7 may be $n$-dimensional, where $n$ corresponds to the number of stator coil pairs.

A particular circuit for driving a stepping motor such as 110 of FIG. 5 in the manner represented in the Veitch diagram of FIG. 7 is shown in block diagram form in FIG. 8. In this diagram flip-flop stages XL1, XL2 and XL3 are shown, each having binary outputs (0 and 1) and set (S) and reset (R) leads. These flip-flops are interconnected by stages with a plurality of "AND" and "OR" gates to provide the desired steering of applied input pulses for controlling the system. Thus, in the first stage in which XL1 is situated, "AND" gates 101, 102 and 103 are interconnected with an "OR" gate 105 and the flip-flop XL1. Similarly the second stage is shown comprising "AND" gates 201, 202 and 203 with "OR" gate 205 and the flip-flop XL2 and the third stage comprises "AND" gates 301, 302 and 303 and "OR" gate 305 with the flip-flop XL3. The three stages are interconnected identically. In addition, a pulse source provides CW (clockwise) and CCW (counter-clockwise) pulses on circuit input leads 91 and 92 respectively to an "OR" gate 94, the output of which is directed to corresponding points in the three stages. The pulses from the "OR" gate 94 are variously directed within the respective stages depending on the existing states of the flip-flops XL1–XL3.

Taking the first stage as an example, the input pulse from the "OR" gate 94 (which coresponds to either a CW or CCW pulse) is directed into the stage to set the flip-flop XL1 and to enable the "AND" gates 102 and 103 only if the "AND" gate 101 is enabled by an active condition on the 0 output lead of the flip-flop XL1, which corresponds to the flip-flop being in the inactive or reset state. Thus, it may be seen that an inactive flip-flop is set to the active state upon the application of any control pulse. Gates 102 and 103, being enabled by the pulse assumed passed by gate 101, permit the applied control pulse (either CW or CCW) to pass to a succeeding "OR" gate 105 or 205, depending on the order of the energization sequence and whether flip-flop XL2 or XL3 is to be reset. Thus, if flip-flop XL1 is inactive when a CW pulse is applied, flip-flop XL2 is reset and XL1 is set to produce a clockwise step of rotation for the stepping motor, whereas if a CCW pulse is received the flip-flop XL3 is reset instead to produce a counter-clockwise step of rotation. In addition to the circuitry already described, an "AND" gate 120 is provided as shown for the purpose of handling the situation which may occur in which all flip-flops are energized simultaneously. The gate 120 is coupled to the 1 output leads of the flip-flops so as to be enabled in such a situation. The next control pulse, CW or CCW, is passed by the enabled gate 120 through the "OR" gate 305 as an added input thereof to reset the flip-flop stage XL1, thus establishing the desired condition of having the flip-flops XL2 and XL3 on, as indicated in FIG. 7. It may thus be seen how the circuitry depicted in FIG. 8 provides the desired operation in accordance with the Veitch diagram of FIG. 7, regardless of the energization state of the system upon receipt of the applied control pulses.

Figure 9:
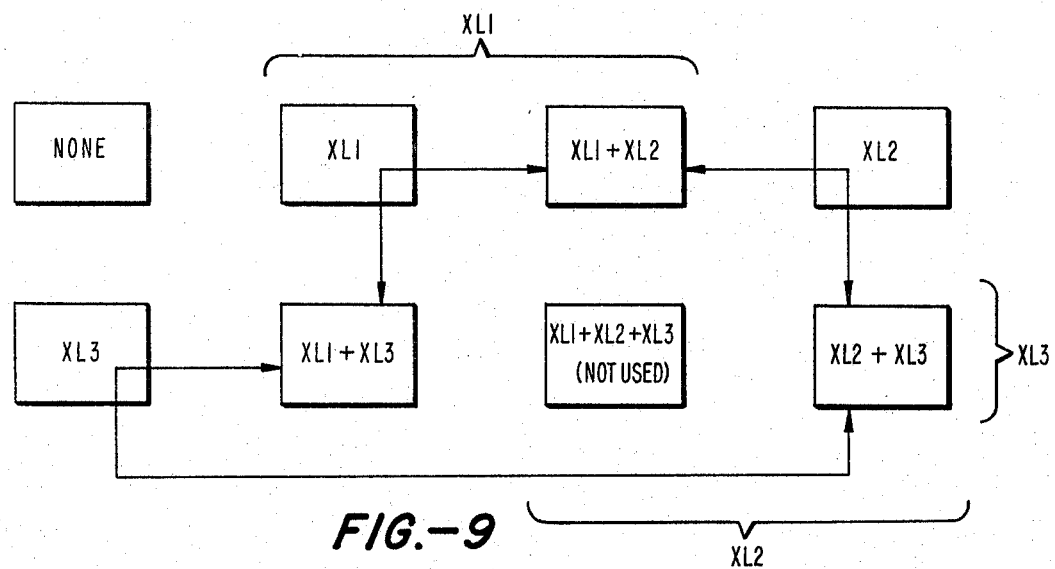
FIG. 9 is a diagram representing another mode of operation of the motor of FIG. 5 in accordance with an aspect of the invention.
Figure 10:
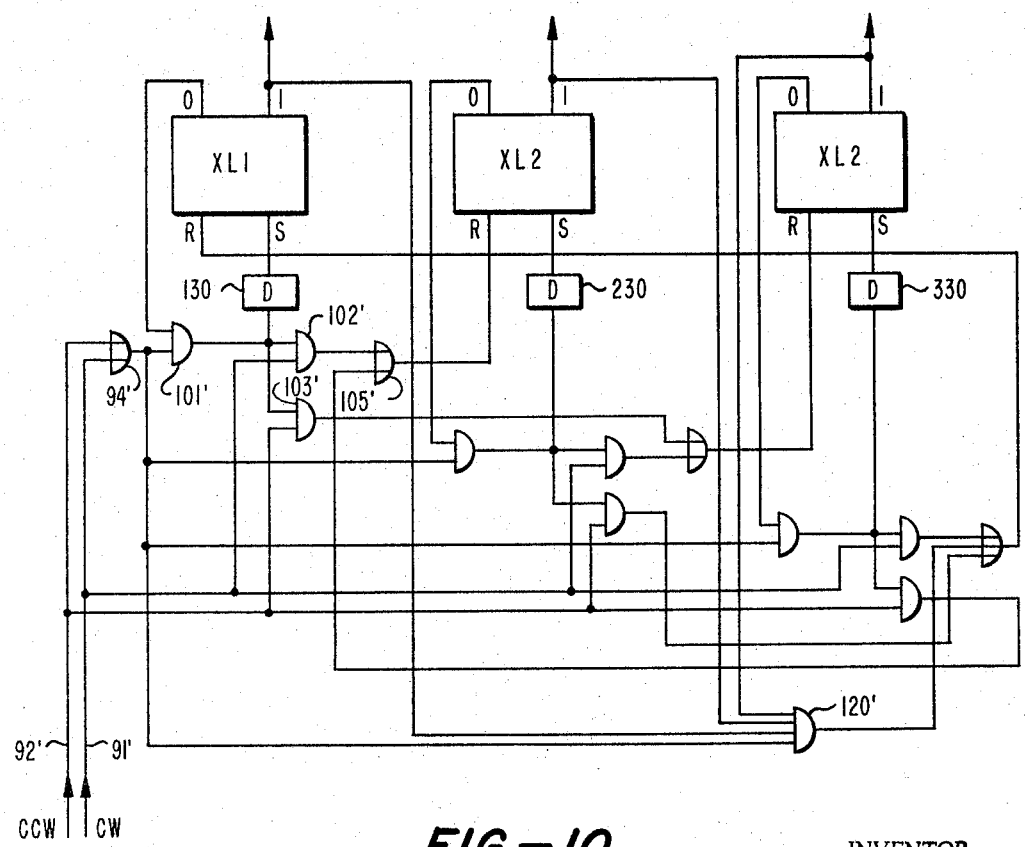
FIG. 10 is a block diagram illustrating a second particular arrangement of control circuitry used in a stepping motor control system in accordance with the invention.

FIGS. 9 and 10 represent a particular embodiment of the invention for driving a stepping motor with improved operation wherein a transition step is provided between the dual-pair coil set energization states as represented in FIG. 7. FIG. 9 is a Veitch diagram similar to FIG. 7 except that transition steps are shown which involve the temporary energization of a single coil pair alone. Otherwise the operation of this embodiment is like that of FIG. 7 and only the transitions which are different therefrom are depicted in FIG. 9 for simplicity. FIG. 10 shows the corresponding circuit in block diagram form, and is identical to the circuit of FIG. 8, except for the provision of a delay element 130, 230 or 330 in series with the S (set) lead of each of the three stages. The delay of these elements is selected to be approximately one-half the period of the applied control pulses and, as shown, serves to insure that the flip-flop which is being de-energized is reset by a time interval equal to the delay interval before the succeeding flip-flop is set.

Although there have been described specific arrangements and methods of a system for driving an incremental stepping motor in accordance with the invention for illustrating the manner in which the invention may be used to advantage, it will be appreciated that the invention is not limited thereto. Accordingly, any and all modifications, variations, or equivalent arrangements falling within the scope of the annexed claims should be considered to be a part of the invention.

What is claimed is:

1. An arrangement for driving a stepping motor for a digital incremental plotter in which the stepping motor comprises a first plurality of stator poles and corresponding stator pole coils and a second plurality of rotor poles different in number from the plurality of stator poles, said stator pole coils being interconnected by pairs in series circuit, comprising driving means for energizing said stator pole coils by sets in sequence, each set containing at least two pairs of coils, in order to develop an incremental steppping motion of the rotor, at least one pair of rotor poles undergoing at least one reversal of magnetic polarity in a full revolution of the rotor, and means for controlling said driving means to drive said rotor in either direction as selected and further including means for de-energizing one pair of a set of energized coil pairs a predetermined time interval before energizing the next coil pair in sequence in order to develop a transitional energization state of said stepping motor.

2. An arrangement for driving a steppping motor for a digital incremental plotter in which the stepping motor comprises a first plurality of stator poles and corresponding stator pole coils and a second plurality of rotor poles different in number from the plurality of stator poles, said stator pole coils being interconnected by pairs in series circuit, comprising driving means for energizing said stator pole coils by sets in sequence, each set containing at least two pairs of coils, in order to develop an incremental stepping motion of the rotor, at least one pair of rotor poles undergoing at least one reversal of magnetic polarity in a full revolution of the rotor, and means for controlling said driving means to drive said rotor in either direction as selected and further including means for de-energizing one pair of a set of energized coil pairs a predetermined time interval before energizing the next coil pair in sequence in order to develop a transitional energization state of said stepping motor and further including means for developing a predetermined energization state of the stepping motor upon the occurrence of any energization state which does not fall within a sequence of stepping motor operation by the energization of successive coil sets.

3. A stepping motor drive system for a digital incremental plotter, comprising: at least one stepping motor having three pairs of oppositely disposed stator poles and associated stator pole coils, the coils being interconnected in series by pairs, and a rotor having four poles evenly spaced about its periphery; three stages, each including a flip-flop individually connected to a corresponding coil pair, first, second and third "AND" gates and an "OR" gate interconnected together and to the associated flip-flop; means in each stage connecting a 0 output of the flip-flop to enable the first "AND" gate, the output of the first "AND" gate to enable the second and third "AND" gates, and the output of the second "AND" gate to the "OR" gate; a source of control pulses; means for applying said pulses to said first "AND" gate of each stage and selectively to the second and third "AND" gates of each stage; means for setting a flip-flop from the output of its associated first "AND" gate; means for resetting a flip-flop from the "OR" gate of a different stage depending on the direction of rotation of the stepping motor indicated by an applied control pulse; and a common "AND" gate for resetting a particular flip-flop upon receipt of a control pulse when all of the flip-flops are in the set state.

4. An arrangement for driving a stepping motor for a digital incremental plotter in which the stepping motor comprises a first plurality of stator poles and corresponding stator pole coils and a second plurality of rotor poles different in number from the plurality of stator poles and magnetizable by the field from said stator poles, said stator pole coils being interconnected by pairs in series circuit, comprising: means for energizing said stator pole coils by sets in sequence, each set containing at least two pairs of coils, in order to develop an incremental stepping motion of the rotor, at least one pair of rotor poles undergoing at least one reversal of magnetic polarity during a full revolution of the rotor, means for de-energizing one pair of a set of energized coil pairs a predetermined time interval before energizing a next coil pair in sequence to develop a transitional energization state of the stepping motor, and means for controlling said energizing means to drive said rotor in either of two directions as selected.

5. An arrangement in accordance with claim 4 wherein said energizing means comprises a plurality of flip-flops, one for each stator pole coil pair, and further comprising pulse directing means for controlling the states of said flip-flops in response to applied control pulses.

6. An arrangement in accordance with claim 5 wherein said pulse directing means are interconnected to direct pulses to set two of said flip-flops concurrently and further including additional pulse directing means responsive to the condition when all of the flip-flops are set to reset all but two of said flip-flops.

7. An arrangement for driving a stepping motor for a digital incremental plotter in which the stepping motor comprises a first plurality of stator poles and corresponding stator pole coils and a second plurality of rotor poles different in number from the plurality of stator poles and magnetizable by the field from said stator poles, said stator pole coils being interconnected by pairs in series circuit, comprising means for energizing said stator pole coils by sets in sequence, each set containing at least two pairs of coils, in order to develop an incremental stepping motion of the rotor, at least one pair of rotor poles undergoing at least one reversal of magnetic polarity during a full revolution of the rotor, means for controlling said energizing means to drive said rotor in either direction as selected, and means for de-energizing one pair of a set of energized coil pairs a predetermined time interval before energizing a next coil pair in sequence in order to develop a transitional energization state of said stepping motor.

References Cited

UNITED STATES PATENTS

| | | | |
|---|---|---|---|
| 3,293,459 | 12/1966 | Kreuter | 310—49 |
| 3,250,977 | 5/1966 | Heggen | 310—49 X |
| 3,297,927 | 1/1967 | Blakeslee et al. | 310—49 X |
| 3,304,480 | 2/1967 | Ko | 318—138 |
| 3,112,433 | 11/1963 | Fairbanks | 318—138 X |
| 3,124,732 | 3/1964 | Dupy | 318—138 |
| 3,218,535 | 11/1965 | Holthaus et al. | 318—138 X |
| 3,127,548 | 3/1964 | Van Emden | 310—49 X |
| 3,243,677 | 3/1966 | Cannalte et al. | 318—138 |

ORIS L. RADER, *Primary Examiner.*

BENJAMIN DOBECK, *Examiner.*

G. SIMMONS, *Assistant Examiner.*